US00RE38212E

(19) United States
(12) Reissued Patent
Westcott et al.

(10) Patent Number: US RE38,212 E
(45) Date of Reissued Patent: Aug. 12, 2003

(54) SHEET FEEDING DEVICE

(75) Inventors: Robert M. Westcott, Holley, NY (US); William J. Greene, Jupiter, FL (US); Randall R. Maysick, Churchville, NY (US); Steven L. Moore, Dansville, NY (US)

(73) Assignee: Eastman Kodak Company, Rochester, NY (US)

(21) Appl. No.: 09/900,568

(22) Filed: Jul. 6, 2001

Related U.S. Patent Documents

Reissue of:
(64) Patent No.: 5,921,539
Issued: Jul. 13, 1999
Appl. No.: 08/825,037
Filed: Mar. 26, 1997

(51) Int. Cl.[7] ..... B65H 5/00
(52) U.S. Cl. ..... 271/10.03; 271/10.11; 271/110; 271/116; 271/121; 271/125; 271/265.02
(58) Field of Search ..... 271/10.03, 10.11, 271/10.13, 104, 110, 114, 116, 121, 125, 265.02, 37, 117, 109

(56) References Cited

U.S. PATENT DOCUMENTS 3,961,786 A * 6/1976 Yanker ..... 271/10.03
3,981,493 A * 9/1976 Klappenecker et al. ..... 271/114
4,822,021 A * 4/1989 Giannetti et al. ..... 271/121
4,974,680 A * 12/1990 Nishida et al. ..... 271/109
5,006,903 A * 4/1991 Stearns ..... 271/121
5,007,627 A * 4/1991 Giannetti et al. ..... 271/121
5,265,859 A * 11/1993 Watson et al. ..... 271/109
5,421,569 A * 6/1995 Davidson ..... 271/109
5,462,267 A * 10/1995 Hori ..... 271/10.04
5,709,380 A * 1/1998 Petocchi et al. ..... 271/117

FOREIGN PATENT DOCUMENTS

JP 403216428 * 9/1991 ..... 271/10.11
JP 405032356 * 2/1993 ..... 271/110.11
JP 406263279 * 9/1994 ..... 271/10.11

* cited by examiner

*Primary Examiner*—Christopher P. Ellis
*Assistant Examiner*—Mark A. Deuble
(74) *Attorney, Agent, or Firm*—Nelson Adrian Blish

(57) ABSTRACT

A sheet feeding device (2) for separating an outermost sheet (4) from a stack (6). The sheet feeding device (2) comprises a stack support means (8) positioned in a first portion (10) of a housing (12), and a feed module (14) detachably mounted to a second portion (16) of the housing (12) and adapted to be positioned in contact with the stack (6). The feed module (14) includes an urging means (18) mounted on the feed module (14) by an infeed shaft (20) and a feed means (22) mounted on the feed module (14) by a feed roller shaft (24). A separation means (26) is detachably and pivotally mounted to the second portion (16) of the housing (12) by a support means (28). The separation means (26) is positioned adjacent to the feed means (22) so as to define a nip therebetween. A drive means (32) for driving the feed module (14) is mounted to the second portion of the housing (12). A clutch means (90) attached to the drive means (32) transmits an intermittent drive force to the feed module (14). A method for feeding an outermost sheet from a stack through a sheet feeding device is also described.

41 Claims, 7 Drawing Sheets

SHEET FEEDING DEVICE

Matter enclosed in heavy brackets [ ] appears in the original patent but forms no part of this reissue specification; matter printed in italics indicates the additions made by reissue.

*This application is a reissue application for U.S. Pat. No. 5,921,539 issued Jul. 13, 1999 on U.S. Ser. No. 08/825,037 filed Mar. 26, 1997.*

FIELD OF THE INVENTION

This invention relates to a sheet feeding device for separating the outermost sheet from a stack of sheets. More specifically, it relates to a sheet feeding device for use in an imaging transport such as a fax, copier or scanner.

BACKGROUND OF HE INVENTION

Although the sheet feeding art is quite old, modern electrostatic copiers and electronic scanners have required its perfection. The most critical sheet feeding task in a scanner is the document handler. In order to maintain the page sequential order of a stack of original document sheets, the sheets are commonly fed off the bottom of the stack. Because of the weight of the stack, bottom separation is difficult and limits the height of the stack and a top sheet feeder would be desirable.

Document originals often vary in size, weight, age and condition. However, nearly all document handlers presently on the market come with instructions not to feed originals of unusual weight or of poor condition. A feeder which can handle a wide variety of types of originals would also be desirable.

Document feeders for sheet materials typically consist of three basic elements, commonly an urging means such as a roller or belt, a feed means such as a roller or belt, and a retard means or separation device. The urging means imparts a force to the sheet being fed and directs it into the feed means. The feed means transports the sheet to the imaging transport path. The retard means is intended to hold back the other sheets in the stack so that only one sheet is fed into the imaging means at one time.

In a document scanner it is desirable to transport single sheets as described above one-by-one from a stack into the imaging transport. It is also desirable to be able to feed odd documents such as stapled documents, very thin documents, or documents in a protective covering, that would not normally feed well through conventional document feeders that use a retard or separation means. A device that would allow easy conversion between manual feed, where the separation force is removed, and auto feed, would be highly desirable.

In certain situations, it is desirable to disengage or remove the separation means from the paper path for cleaning or replacement. Currently available scanners provide for moving the separation means away from the document by depressing a lever. However, these models use separation rollers that are counter driven and require a drive means associated with the separation means. A device that avoids such rollers would be smaller and more easily serviced.

SUMMARY OF THE INVENTION

In one embodiment of the invention, there is provided a sheet feeding device which includes a sheet transport means, a feed means, a separation means, and a clutch means. The device is useful for separating an outermost sheet from a stack. The feed means is for feeding the outermost sheet from the stack and is positioned so as to frictionally contact the outermost sheet to advance the outermost sheet toward the sheet transport means. The separation means is positioned adjacent to the feed means to prevent double feeding along a sheet path between the feed means and the separation means. A nip is defined between the separation means and the feed means. The clutch means is in operable association with the feed means and is for transmitting an intermittent drive force to the feed means. The sheet transport means includes a trailing edge sensing means and a leading edge sensing means. The trailing edge sensing means is for sensing when a trailing edge of the outermost sheet is positioned downstream of the nip and activating the clutch means in response thereto. The leading edge sensing means is for sensing when a leading edge of the outermost sheet is positioned downstream of a first transport roller of the sheet transport means and deactivating the clutch means in response thereto.

In another embodiment of the invention, there is provided a sheet feeding device which comprises a feed means, a separation means, a clutch means, and a retraction means. The sheet feeding device is for separating an outermost sheet from a stack. The feed means is for feeding the outermost sheet. The feed means is positionable in frictional contact with the stack to advance the outermost sheet toward the sheet transport means. The separation means is positioned adjacent to the feed means to prevent double feeding of sheets along a sheet path between the feed means and the separation means. A nip is defined between the feed means and the separation means. The separation means includes an internally braked separation roller. The clutch means is in operable association with the feed means and is for transmitting an intermittent drive force to the feed means. The retraction means is for retracting the separation means away from the sheet path. The retraction means is coupled to the separation means.

In another embodiment of the invention, there is provided a sheet feeding device comprising a stack support means, a feed module, a separation means, a drive means, a clutch means and a sheet transport means. The sheet feeding device is for separating an outermost sheet from a stack. The stack support means is for supporting a stack positioned in a first portion of a housing. The feed module is detachably and pivotally mounted to a second portion of the housing for positioning in contact with the stack. The feed module includes urging means and a feed means. The urging means is mounted in the feed module using an infeed shaft. The feed means is mounted in the feed module using a feed roller shaft. The separation means is detachably mounted to the first portion of the housing by a support means. The separation means is positioned adjacent to the feed means to define a nip between the separation means and the feed means. The drive means is for driving the feed module. The drive means is mounted in the second portion of the housing. The clutch means is connected to the drive means for transmitting an intermittent drive force from the drive means to the feed module. The sheet transport means is mounted to the housing for receiving an outermost sheet from the feed means. The sheet transport means includes a series of transport rollers, a trailing edge sensing means, and a leading edge sensing means. The series of transport rollers is for receiving an outermost sheet from the feed means. The trailing edge sensing means is for detecting a trailing edge of the outermost sheet and is positioned downstream of the nip, so that the clutch means is activated when the trailing edge of the outermost sheet is detected by the trailing edge sensing means. The leading edge sensing means is for detecting a leading edge of the outermost sheet. The leading edge sensing means is positioned downstream of a first transport roller, so that the clutch means is deactivated when the leading edge of the outermost sheet is detected by the leading edge sensing means.

In another embodiment of the invention, there is provided a sheet feeding device which comprises a stack support means, a feed module, a separation means, a sheet transport means, a drive means, a clutch means, and a retraction means. The sheet feeding device is for separating an outermost sheet from a stack. The stack support means is disposed in a first portion of a housing. The feed module is detachably mounted to a second portion of the housing so as to be positionable in contact with the stack. The feed module includes an urging means mounted in the feed module by an infeed shaft; and a feed means mounted in the feed module by a feed roller shaft. The separation means is detachably mounted to the first portion of the housing by a support means and is positionable adjacent to the feed module, so as to define a nip between the feed module and the separation means. The sheet transport means is mounted to the housing and is for receiving an outermost sheet from the feed means. The drive means is mounted to the housing for driving the sheet transport means and the feed module. The clutch means is connected to the drive means and is for transmitting an intermittent drive force from the drive means to the feed module. The retraction means is for retracting the separation means away from the feed module. The retraction means is coupled to the separation means. The separation means comprises an internally braked separation roller.

In another embodiment of the invention, there is provided a method for feeding an outermost sheet from a stack through a sheet feeding device. The method comprises placing a stack on a sheet feeding device; urging an outermost sheet on top of the stack forward using a feed module; separating the outermost sheet from the stack using a separation means; and transporting the outermost sheet through a sheet transport means. The advantage is to control the feed module by an electromechanical clutch driven by a drive means.

It is an object of the present invention to provide a sheet feeding device that is reliable and can be serviced easily by the user. The above described embodiments provide a sheet feeding device that is reliable, inexpensive and easy to service and use with all types of documents. The above described embodiments also provide for retracting the separation means out of the sheet path. This design allows the user to manually feed fragile or stapled documents through the device without any interference with the separation means. The separation means preferably has an internally braked separation roller thus eliminating the requirement of a complex drive system making it easier to remove and clean the internally braked separation roller. The drive means is preferably modular, and is easily removed and serviced. Use of the electronically actuatable clutch permits the sheet to be pulled through the transport rollers with the feed means deactivated. By deactivating the feed means in this manner, the likelihood of paper jams can be reduced.

DETAILED DESCRIPTION OF THE INVENTION

Figure 1:
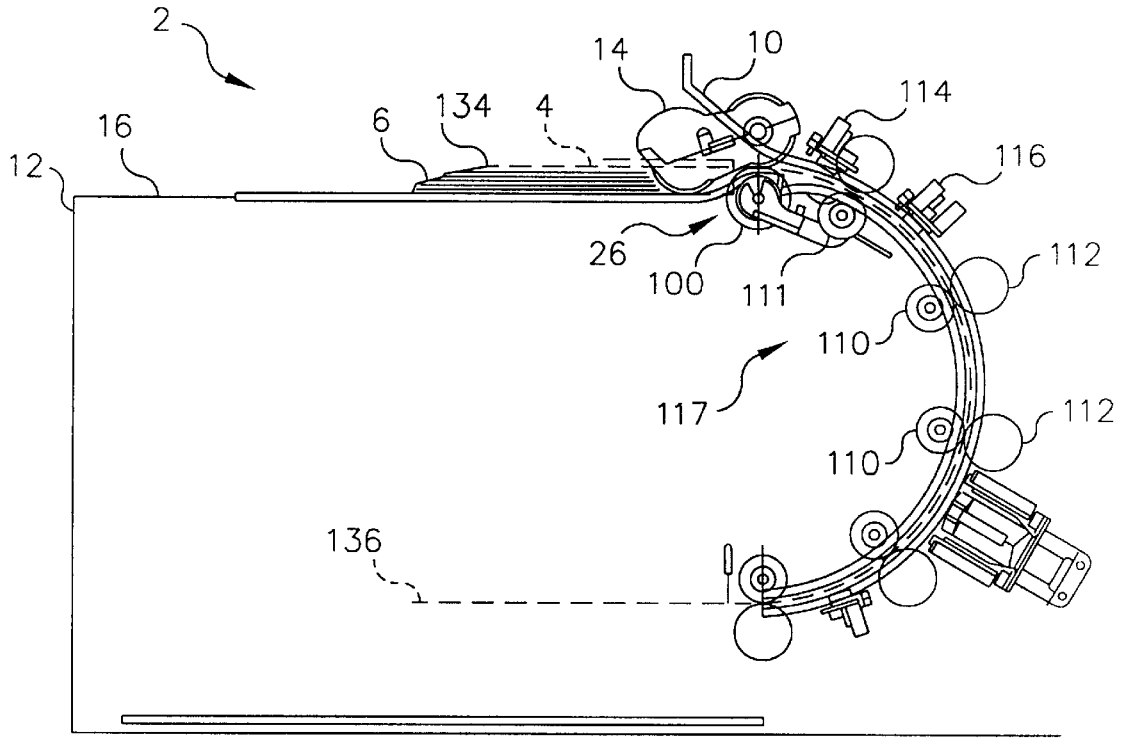
FIG. 1 is a cross-sectional view of the sheet feeding device.
Figure 2:
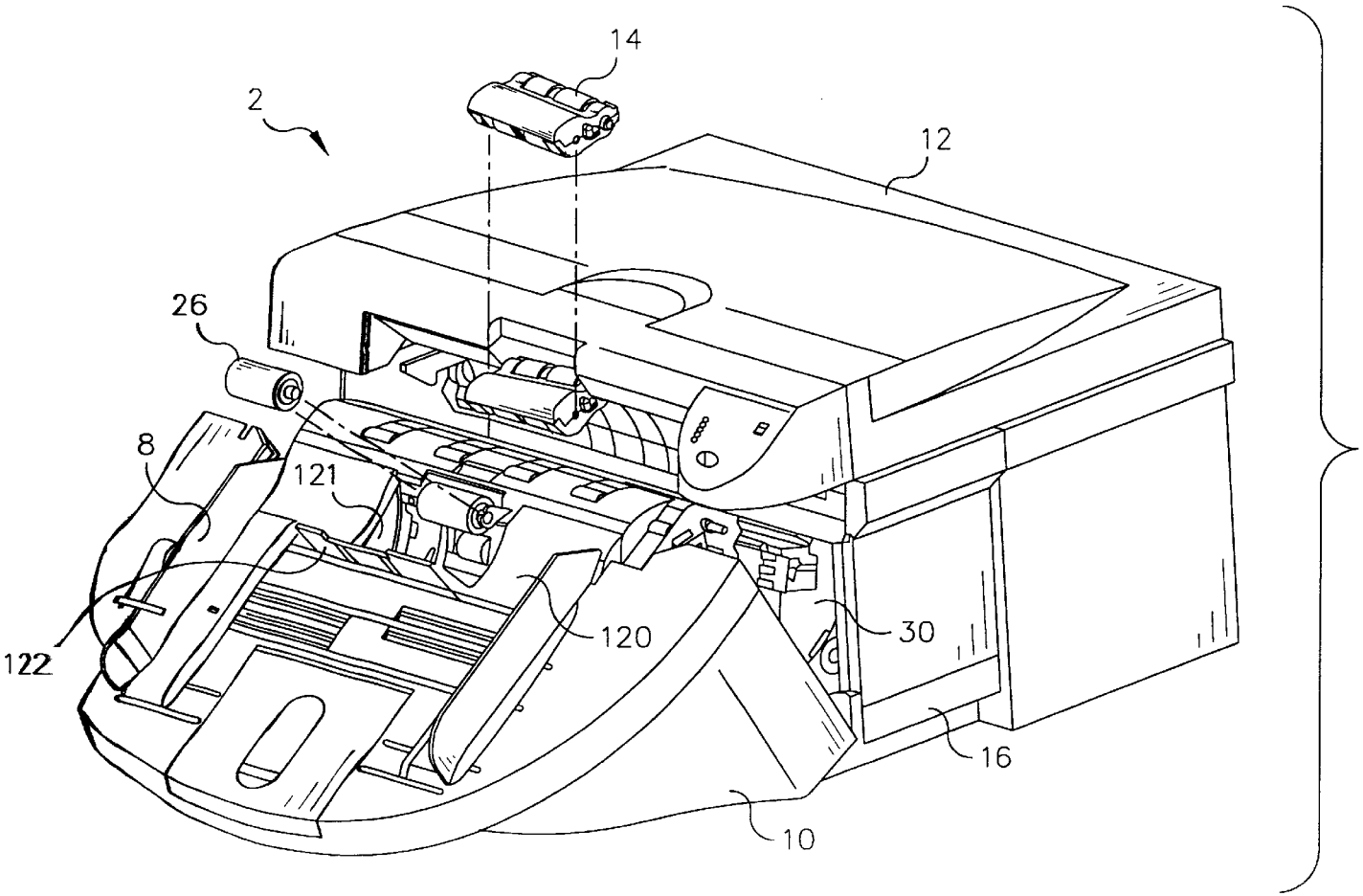
FIG. 2 is a pictorial view of the claimed invention with the housing in an open position.
Figure 3:
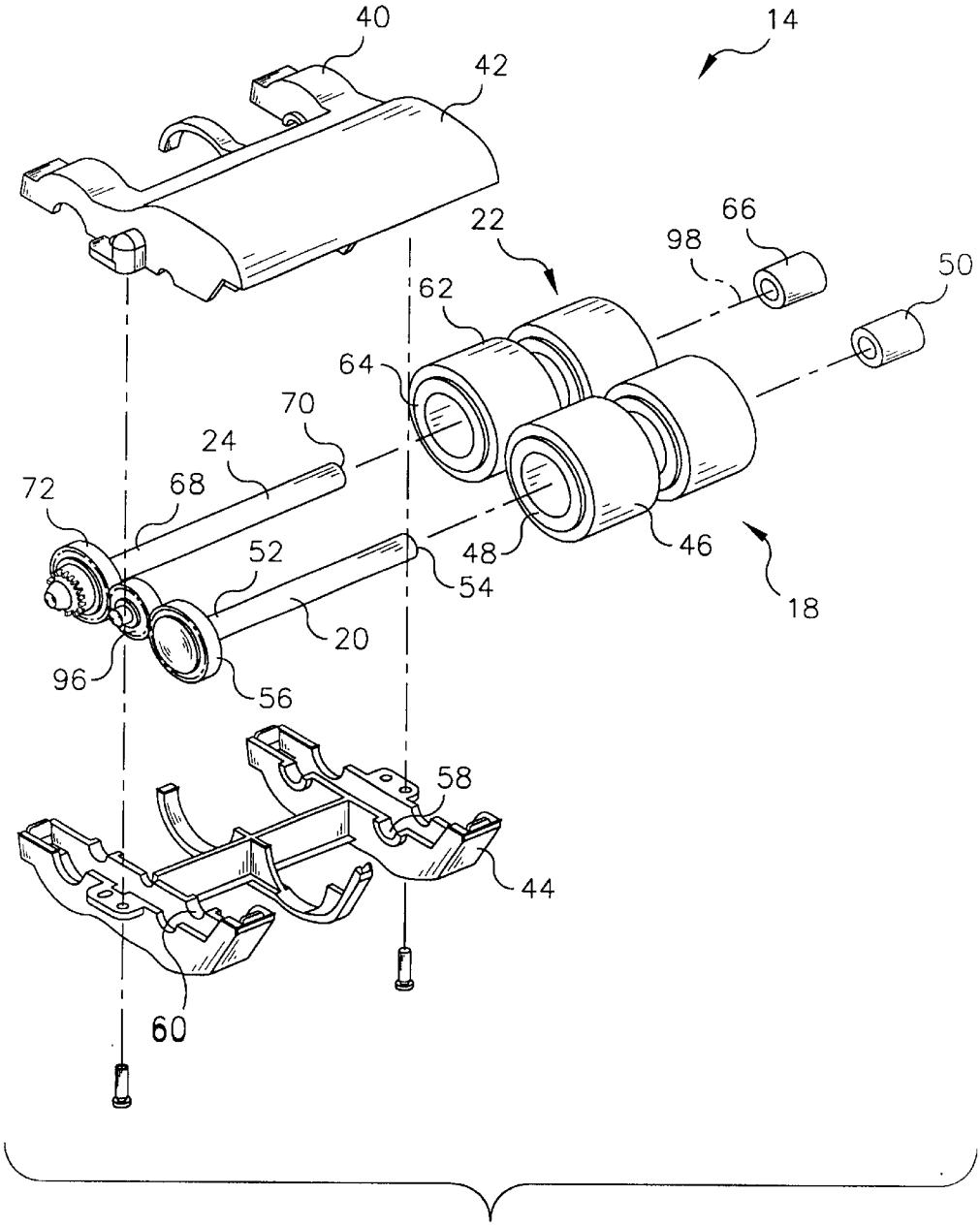
FIG. 3 is an exploded view of the feed module.

In one embodiment of the present invention, there is provided a sheet feeding device 2 for separating an outermost sheet 4 from a stack 6 shown in FIGS. 1 and 2. Preferably, the outermost sheet 4 is the topmost sheet. The sheet feeding device 2 comprises a stack support means 8, disposed in a first portion 10 of a housing 12, and a feed means, preferably a feed module 14, detachably mounted in a second portion 16 of the housing 12 so as to be positionable in contact with the stack 6. The feed module 14 preferably includes an urging means 18, shown in FIG. 3, mounted in the feed module 14 using an infeed shaft 20 and a feed means 22 mounted in the feed module 14 using a feed roller shaft 24.

Figure 4:
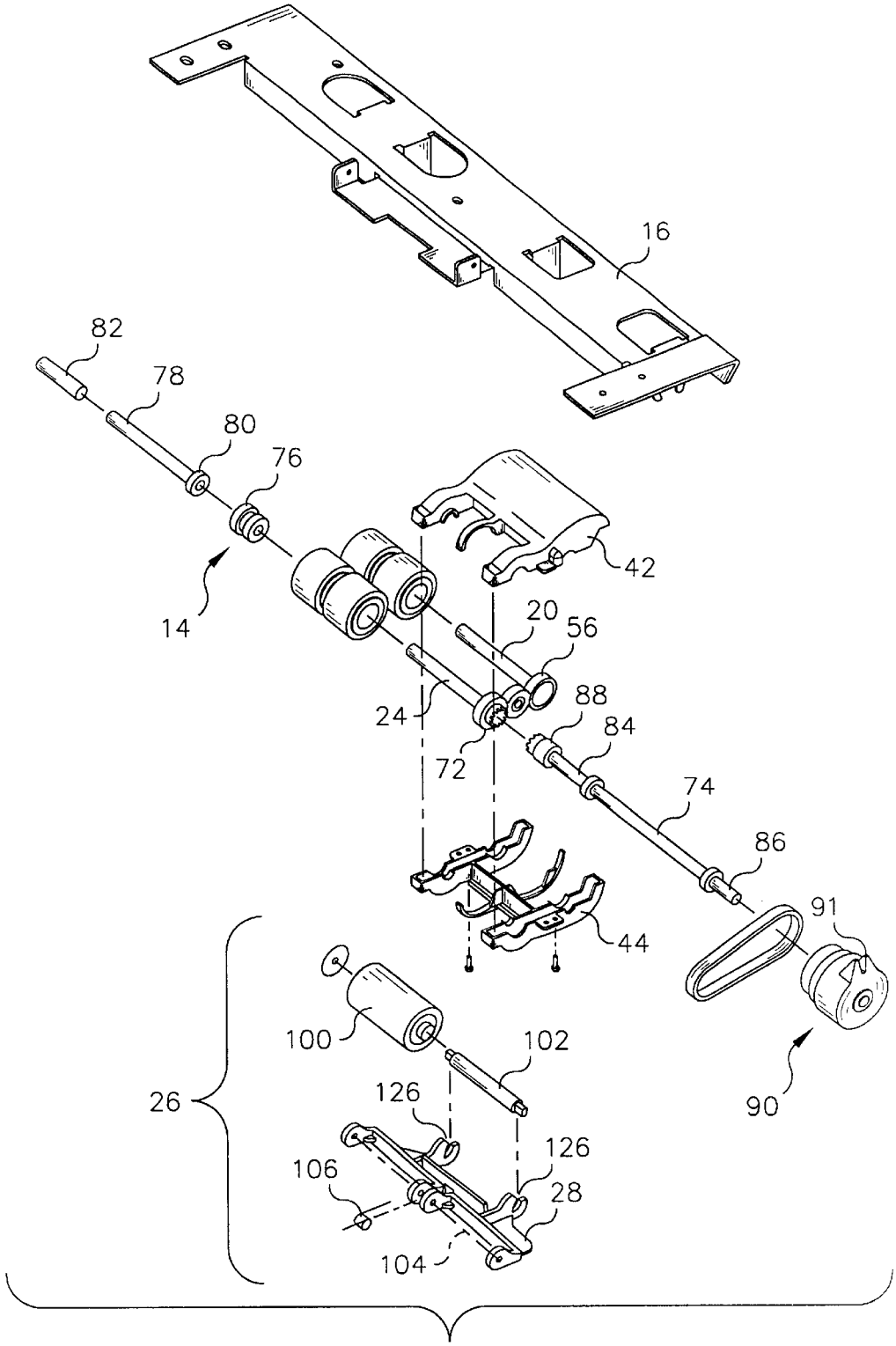
FIG. 4 is an exploded view of the feed module and the separation means.

A separation means 26, shown in FIGS. 2 and 4, is detachably mounted to the first portion 10 of the housing 12 using a support means 28. The separation means 26 is positioned adjacent to the feed means 22 so as to define a nip therebetween. A sheet transport means 117 for receiving an outermost sheet from the feed means 22 is attached to both the first portion 10 and the second portion 16 of the housing 12 as shown in FIG. 1. A sheet path 30 is preferably defined between the separation means 26 and the feed means 22 and the first portion 10 and the second portion 16 of the housing 12.

Figure 8:
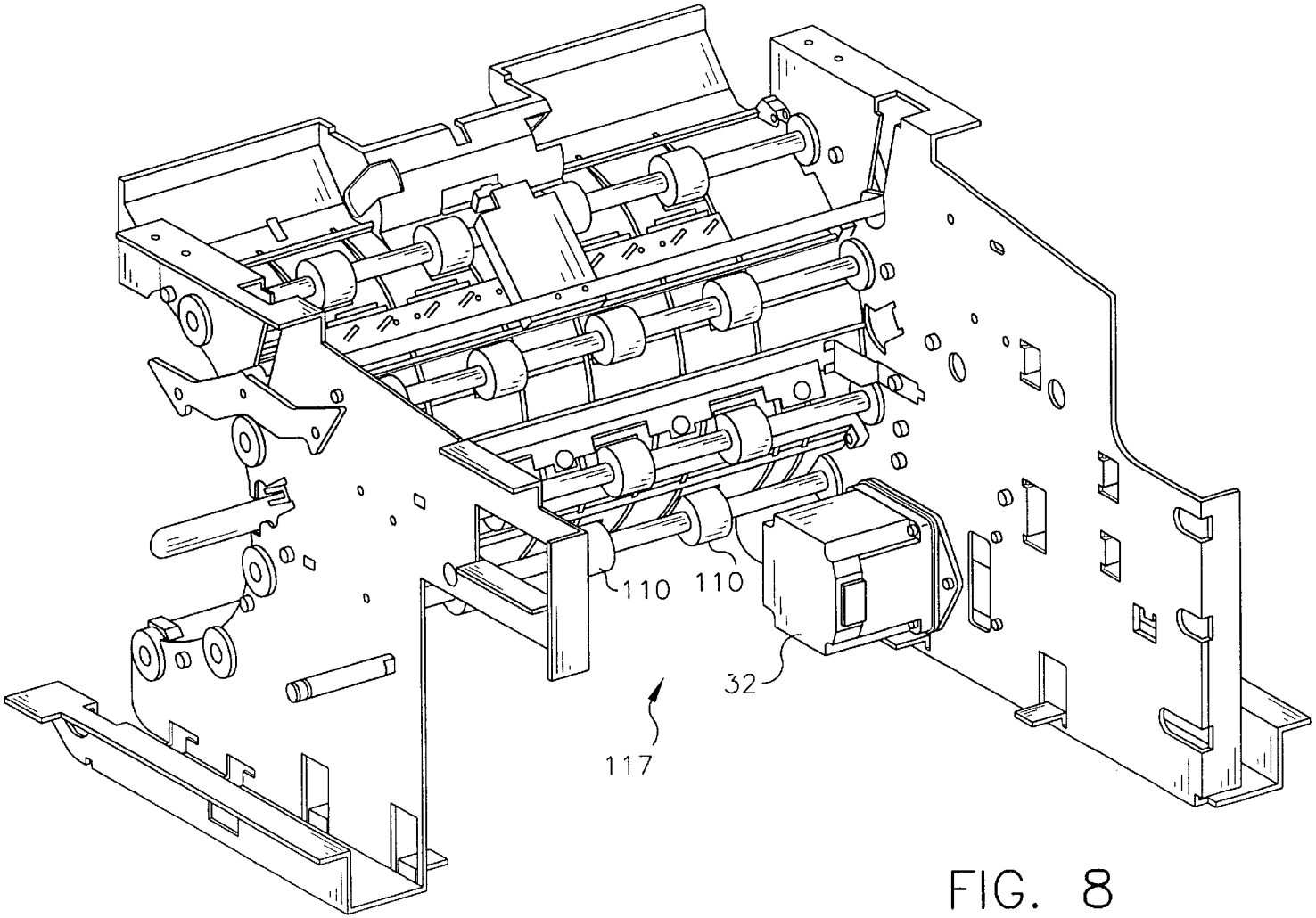
FIG. 8 is a back cutaway view of the sheet feeding device.

A drive means 32 for driving the feed module 14 is mounted in the second portion 16 of the housing 12 as shown in FIG. 8. Referring again to FIG. 4, there is preferably a clutch means 90 connected to the drive means 32 for transmitting an intermittent drive force to the feed module 14. Preferably, the second portion 16 of the housing 12 defines an indent 34, shown in FIG. 6, for housing the feed module 14 adjacent to the stack support means 8. The indent 34 is flanked by portions of the housing defining a drive shaft support means 36 and a support shaft support means 38.

Referring again to FIG. 3, the feed module 14 preferably comprises a feed module housing 40 having an upper portion 42 and a lower portion 44. The feed module housing 40 preferably forms a first bearing 58 between the upper portion 42 and the lower portion 44 and a second bearing 60 between the upper portion 42 and the lower portion 44. The feed module housing 40 is designed to hold the at least one urging roller 46 and the at least one feed roller 62 as well as to prevent dust from accumulating on the feed roller shaft 24.

The urging means 18 preferably has at least one urging roller 46 positioned on an urging roller hub 48 having a first one way bearing 50 positioned therein and mounted on an infeed shaft 20. The infeed shaft 20 has a first end 52 and a second end 54, and an infeed gear 56 positioned near the first end 52 of the infeed shaft. The second end 54 rests in the first bearing 58 formed by the feed module housing 40 and the first end 52 of the infeed shaft 20 rests in the second bearing 60 formed by the feed module housing 40.

The feed means 22 preferably comprises at least one feed roller 62 being positioned on a feed roller hub 64 having a second one way bearing 66 positioned therein. The at least one feed roller 62 is mounted on a feed roller shaft 24. Preferably, the feed roller shaft 24 has a first end 68 and a second end 70. The first end 68 is attached to a self-centering coupling gear 72 that is in operable association with a drive shaft 74. (See FIG. 4) Preferably, an idler gear 96 is positioned between and in operable association with the infeed gear 56 and the self-centering coupling gear 72 to transfer the drive from the self centering coupling gear 72 to the infeed gear 56.

Figure 6:
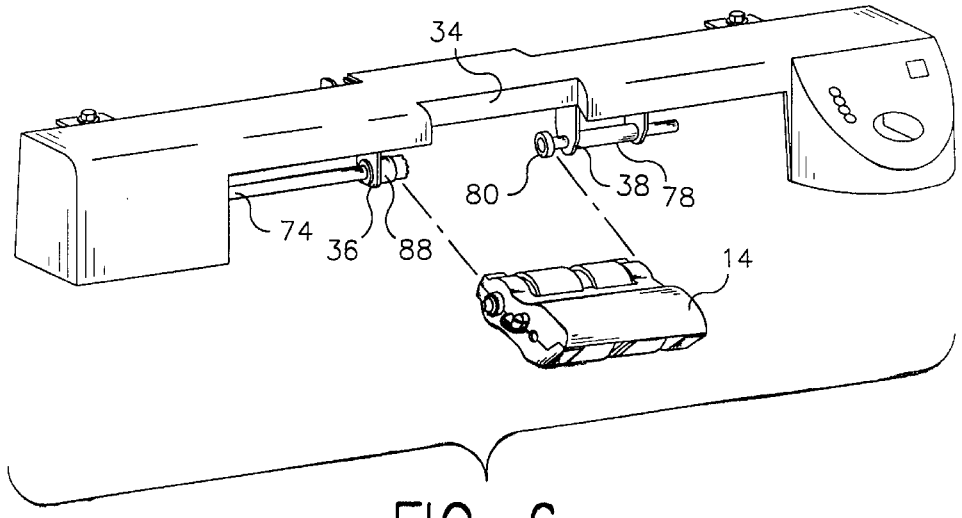
FIG. 6 is a pictorial view of the feed module.

The second end 70 of the feed roller shaft 24 preferably has a self-centering support hub 76 mounted thereon. The self-centering support hub 76 is received by a movable support shaft 78 having a compression spring 82 mounted thereon. The movable support shaft 78 is biased by the compression spring 82 toward the self-centering support hub 76. The drive shaft 74 is rotatably carried by the drive shaft support means 36 and the movable support shaft 78 is slidably and rotatably carried by the support shaft support means 38 as shown in FIG. 6. Preferably, the feed roller shaft 24 has a longitudinal axis 98, and the feed module 14 is pivotable about the longitudinal axis 98. This pivotability enables variation in the height of the stack placed on the stack support means 8. The feed module 14 in the illustrated embodiment can accommodate a stack height of approximately 0.6 inches.

In use, the feed module 14 can be manually replaced by a user by moving the feed module 14 in the direction of the movable support shaft 78, compressing the compression spring 82 and disengaging the coupling gear 72 from the drive shaft 74. (see FIG. 6) This process can be executed in the reverse to install the feed module 14 in the sheet feeding device. The removal and installation of the feed module 14 is user friendly due to the fact that the feed module 14 is not directly coupled to a driver, which would make removal and installation cumbersome.

In a preferred embodiment, shown in FIG. 4, the drive shaft 74 has a first end 84 and a second end 86 and a drive coupler 88 attached to the first end of said drive shaft 84. The second end 86 is connected to the clutch means 90 for transmitting an intermittent drive force to the drive shaft 74. The clutch means 90 can be an electronically actuatable clutch 91 such as an electromechanical clutch. The drive coupler 88 is axially engagable with the self-centering coupling gear 72.

In use, the at least one urging roller 46 picks up the top or outermost sheet to be fed and urges it toward the at least one feed roller 62. The at least one feed roller 62 then feeds the sheet to a first transport roller 111 that pulls the sheet through an imaging system such as a scanner or photocopy machine. At least one urging roller 46 can be decoupled from at least one feed roller 62 by the second one way bearing 66 so that when the electronically actuatable clutch 91 is inactive, at least one urging roller 46 is not driven by movement of at least one feed roller 62. When the electronically actuatable clutch 91 is turned off, the at least one urging roller 46 is only driven by the force of the sheet being fed, and once the trailing edge 134 of the outermost sheet passes the at least one urging roller 46, the at least one urging roller 46 ceases movement. This use of rollers with one way bearings, keeps unwanted sheets from being fed too soon, thus reducing the chance of sheets being misfed or bunching up. At least one urging roller 46 and at least one feed roller 62 can both be decoupled from the infeed shaft 20 and the feed roller shaft 24 by the first one way bearing 50 and the second one way bearing 66, so that the series of transport rollers 110 can rotate at a faster rate than the rotation rate of at least one feed roller 62 and at least one urging roller 46 without causing excess tension (an amount of tension that could result in damage to a sheet) on a fed sheet. The at least one feed roller 62 and at least one urging roller 46 rotate freely about the infeed shaft 20 and the feed roller shaft 24 in the direction of the sheet transport means.

Figure 5:
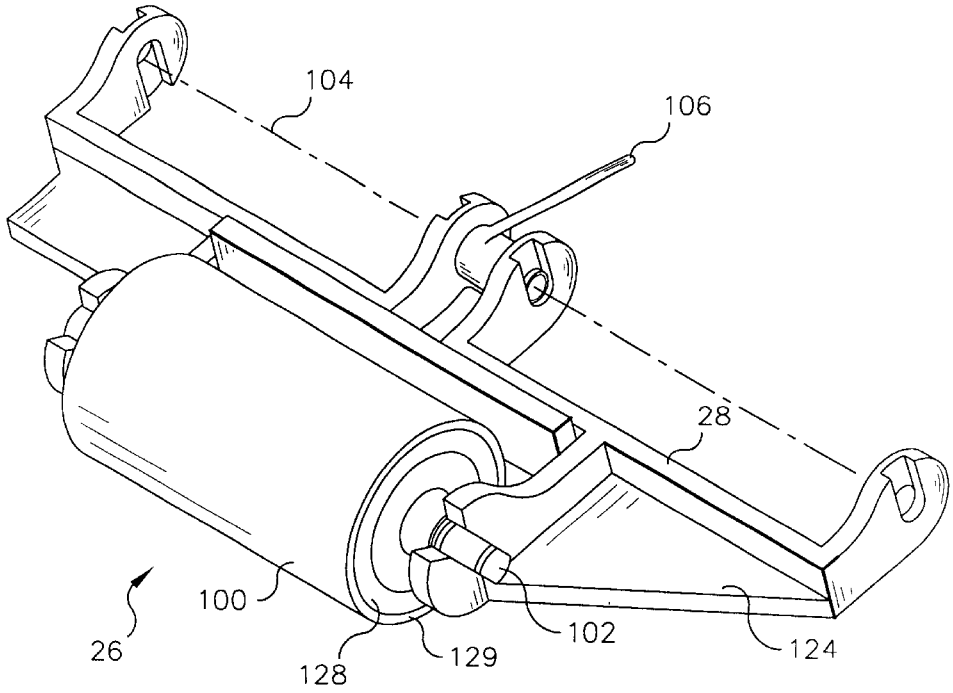
FIG. 5 is a pictorial view of the separation means.

In a preferred embodiment, the separation means 26 comprises an internally braked separation roller 100 mounted on a pivot shaft 102 as shown in FIG. 5. The pivot shaft 102 is detachably mounted on the support means 28, preferably by a snap fit. The support means 28 is pivotable about a pivot axis 104 and is biased toward the at least one feed roller 62 by a spring means 106. The separation means 26 keeps underlying sheets from being fed into the sheet feeding device too soon. The internally braked separation roller 100 is a roller with an internal braking means (not shown) such as a commercially available magnetic clutch, passive, not actively driven, positioned therein. Use of a magnetic clutch is less expensive and more reliable than the commonly used spring wrap clutch.

The internally braked separation roller 100 can have a core overlaid with a soft compliant material 128 that is coated with a material 129 having a high coefficient of friction, such as is described in U.S. Pat. No. 5,190,277 to Rahman and incorporated by reference herein. The high coefficient of friction material 129 described in U.S. Pat. No. 5,190,277 is a silicone elastomer having a Shore/durometer of less than 35.

The sheet transport means 117 is for receiving an outermost sheet from the feed means 22. The sheet transport means 117 preferably includes a frame means having a series of transport rollers 110 mounted in the second portion 16 of the housing 12 and a frame means having series of opposing idler rollers 112 mounted in the first portion 10 of the housing 12, as well as a trailing edge sensing means 114 and a leading edge sensing means 116. (See FIG. 1) The trailing edge sensing means 114 detects a trailing edge 134 of the outermost sheet 4 and is positioned downstream of the nip, so that the electronically actuatable clutch 91 is activated when the trailing edge 134 of the outermost sheet is detected by the trailing edge sensing means 114. The leading edge sensing means 116 positioned downstream of a first transport roller 111 and is used to detect a leading edge 136 of the outermost sheet, so that the electronically actuatable clutch 91 is deactivated when the leading edge 136 of the outermost sheet is detected by the leading edge sensing means 116.

In another embodiment of the present invention, there is provided a sheet feeding device 2 for separating an outermost sheet 4 from a stack 6 having a stack support means 8 disposed in a first portion 10 of a housing 12, a feed module 14 with an urging means 18 and a feed means 22, and a separation means 26 as described above. There is a sheet transport means 117 for receiving an outermost sheet 4 from the feed means 22 mounted in the second portion 16 of the housing 12 and a retractions means 118 for retracting the separation means 26 out of a sheet path 30. The retraction means 118 is coupled to the separation means 26. Preferably, the second portion 16 of the housing 12 comprises a panel means 120 defining an opening 121 therein. The panel means 120 further defines a door 122 for partially covering the opening. The separation means 26 is positioned within the opening 121 so that when the door 122 is in a closed position, the internally braked separation roller 100 is partially covered. (See FIG. 2)

Figure 7:
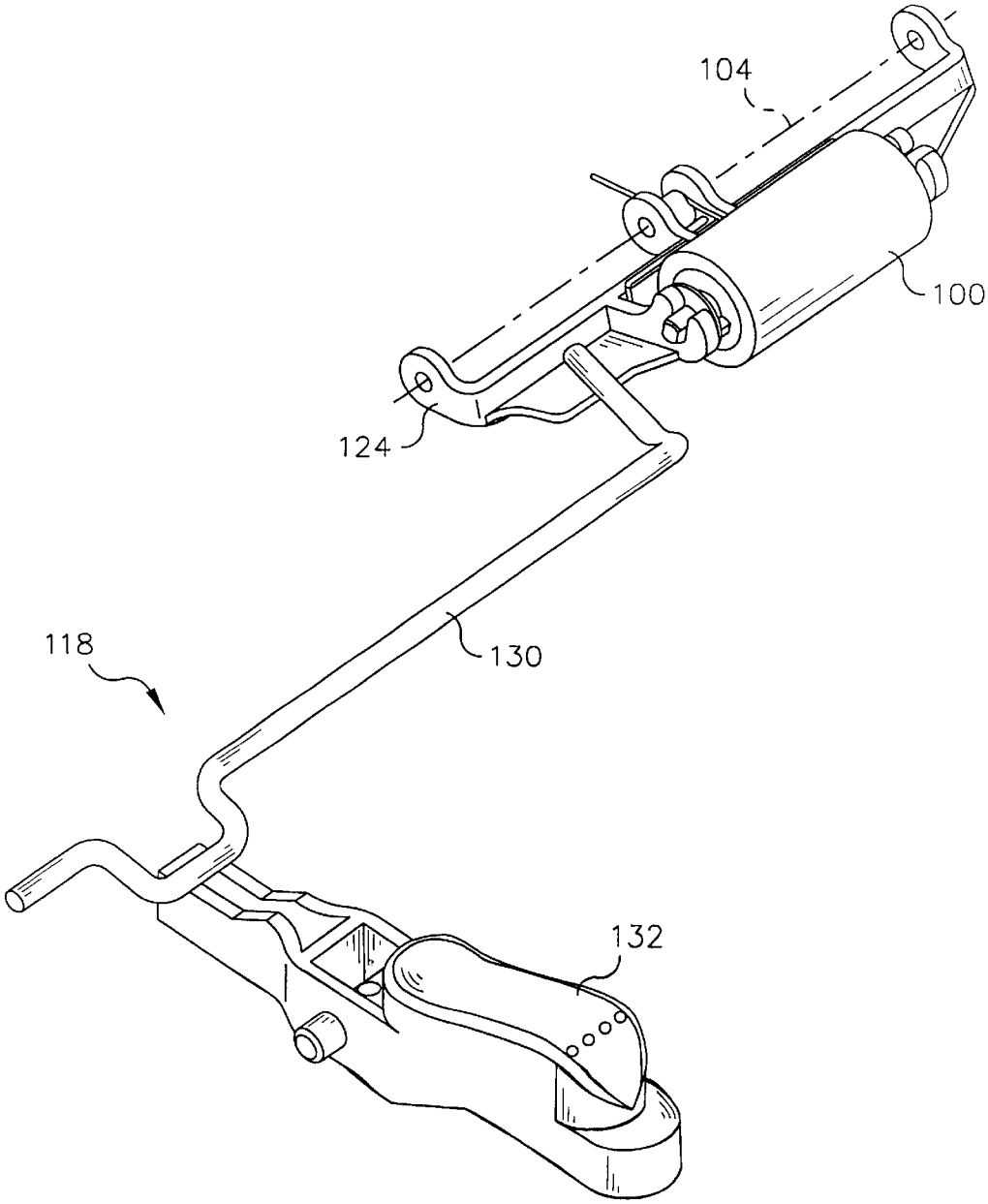
FIG. 7 is a pictorial view of the retraction means.

The separation means 26 can be an internally braked separation roller 100 having an internal braking means (not shown) positioned therein as described previously. Preferably, the internally braked separation roller 100 is mounted on a pivot shaft 102. The support means 28 described above preferably comprises a yoke 124 pivotally mounted in the first portion 10 of the housing 12. The yoke 124 defines a pair of slots 126 therein for removably receiving the pivot shaft 102. The yoke 124 also defines a pivot axis 104 which it pivots about when actuated by the retraction means 118. The retraction means 118 can include an actuator means 130 for causing the yoke 124 to pivot about the pivot axis 104 away from the feed module 14. (See FIG. 7). In this embodiment, when a lever 132 is depressed by the user, the actuator means 130 urges the yoke 124 so that it rotates downwardly to move the internally braked separation roller 100 out of position adjacent the sheet path 30. In this state, odd documents such as ones that are stapled, unusually frail or covered in plastic, may be manually fed into the device.

The sheet transport means 117 preferably has a series of transport rollers 110 mounted in the second portion 16 of the housing 12 and a series of opposing idler rollers 112 mounted in the first portion 10 of the housing 12. The sheet transport means also preferably includes a trailing edge sensing means 114, and a leading edge sensing means 116. The trailing edge sensing means 114 is positioned downstream of the nip and detects the trailing edge 134 of the outermost sheet, so that the electronically actuatable clutch 91 is activated when the trailing edge 134 of the outermost sheet is detected by the trailing edge sensing means 114. The leading edge sensing means 116 is positioned downstream of the first transport roller 111 and detects a leading edge 136 of the outermost sheet, so that the electronically actuatable clutch 91 is deactivated when the leading edge 136 of the outermost sheet is detected by the leading edge sensing means 116. Intermittently activating and deactivating the clutch means 90 in this manner allows the sheet feeding device 2 to effectively feed one sheet at a time and reduces the number of multifeeds.

In another preferred embodiment, the first portion 10 of the housing 12 disengages from and pivots away from the second portion 16 of the housing 12, exposing the separation means 26 and the sheet transport means 117. (See FIG. 2) This feature allows the user to easily access the sheet path 30 to clear any paper jams that may occur and service the machine if needed. The internally braked separation roller 100 can also be easily accessed from this position. The user can lift the door 122 to an open position as shown in FIG. 2 and pull the internally braked separation roller 100 out of the slots 126 in the support means 28 with little effort.

In yet another embodiment of the present invention, there is provided a method for feeding an outermost sheet 4 from a stack 6 through a sheet feeding device 2. The method comprises placing a stack on a sheet feeding device as described above, having a feed module 14 detachably mounted on a first portion 10 of a housing 12 and adapted to be positioned in contact with the stack 6. A outermost sheet on top of the stack is urged forward using the feed module 14. The outermost sheet is separated from the stack using a separation means 26. The outermost sheet is transported by the transport rollers 110. Driving of the feed module 14 is controlled by an electronically actuatable clutch 91 that is driven by a drive means 32. The leading edge 136 of the outermost sheet is preferably sensed by the leading edge sensing means 114 and the electronically actuatable clutch 91 is deactivated. The sheet is pulled through the sheet transport means 117 by the transport rollers 110, and the trailing edge 134 of the outermost sheet is preferably sensed by the trailing edge sensing means 116. The electronically actuatable clutch 91 is then activated so that the next sheet in the stack can be picked up by the feed module 14. When an odd shaped document is desired to be fed manually, the separation means 26 can be retracted away from the feed module 14 by the retraction means 118 disclosed previously.

This invention has been described in detail with particular reference to preferred embodiments thereof, but it will be understood that variations and modification can be effected within the spirit and scope of the invention.

PARTS LIST

| | |
|---|---|
| 2. | sheet feeding device |
| 4. | outermost sheet |
| 6. | stack |
| 8. | stack support means |
| 10. | first portion of a housing |
| 12. | housing |
| 14. | feed module |
| 16. | second portion of the housing |
| 18. | urging means |
| 20. | infeed shaft |
| 22. | feed means |
| 24. | feed roller shaft |
| 26. | separation means |
| 28. | support means |
| 30. | sheet path |
| 32. | drive means |
| 34. | indent |
| 36. | drive shaft support means |
| 38. | support shaft support means |
| 40. | feed module housing |
| 42. | upper portion of feed module housing |
| 44. | lower portion of feed module housing |
| 46. | urging roller |
| 48. | urging roller hub |
| 50. | one way bearing |
| 56. | infeed gear |
| 52. | infeed shaft first end |
| 54. | infeed shaft second end |
| 58. | first bearing |
| 60. | second bearing |
| 62. | feed roller |
| 64. | feed roller hub |
| 66. | second one way bearing |
| 68. | feed roller first end |
| 70. | feed roller second end |
| 72. | self-centering coupling gear |
| 74. | drive shaft |
| 76. | self-centering support hub |
| 78. | movable support shaft |
| 82. | compression spring |
| 84. | drive shaft first end |
| 86. | drive shaft second end |
| 88. | drive coupler |
| 90. | clutch means |
| 91. | electronically actuatable clutch |
| 96. | idler gear |
| 98. | axis |
| 100. | internally braked separation roller |
| 102. | pivot shaft |
| 104. | pivot axis |
| 106. | spring means |
| 110. | series of transport rollers |
| 111. | first transport roller |
| 112. | series of idler roller |
| 114. | trailing edge sensing means |
| 116. | leading edge sensing means |
| 117. | sheet transport means |
| 118. | retraction means |
| 120. | panel means |
| 121. | opening |
| 122. | door |
| 124. | yoke |
| 126. | slots |

-continued

| PARTS LIST | |
|---|---|
| 128. | compliant material |
| 129. | friction material |
| 130. | actuator means |
| 132. | lever |
| 134. | trailing edge |
| 136. | leading edge |

We claim:

1. A sheet feeding device for separating an outermost sheet from a stack, said sheet feeding device comprising:

a sheet transport means;

a feed means for feeding said outermost sheet from said stack positioned so as to frictionally contact the outermost sheet of said stack to advance said outermost sheet toward the sheet transport means;

a separation means positioned adjacent to said feed means so as to define a nip between the separation means and the feed means and to prevent double feeding along a sheet path between said feed means and said separation means; and a clutch means in operable association with said feed means for transmitting an intermittent drive force to said feed means;

wherein said sheet transport means comprises:

a trailing edge sensing means for sensing when a trailing edge of said outermost sheet is positioned downstream of the nip and activating said clutch means in response thereto; and a leading edge sensing means for sensing when a leading edge of said outermost sheet is positioned downstream of a first transport roller of the sheet transport means and deactivating the clutch means in response thereto;

said sheet feeding device further comprising a housing for mounting said feed means, said feed means comprising a feed module which is detachably mounted to said housing.

2. A sheet feeding device as in claim 1 wherein said separation means, said clutch means and said sheet transport means are further mounted on said housing, said feed module including:

a feed module frame;

at least one urging roller mounted on said feed module frame via an in feed shaft, said at least one urging roller having a first one way bearing positioned therein; and at least one feed roller mounted on said feed module frame via a feed roller shaft, said at least one feed roller having a second one way bearing positioned therein.

3. A sheet facing device as in claim 2, wherein said feed roller shaft has a first end and a second end, wherein said first end is attached to a self-centering coupling gear that is in operable association with a drive shaft, and said second end of said feed roller shaft has a self-centering support hub mounted thereon, said self-centering support hub being receivingly engaged with a movable support shaft having a compression spring mounted thereon, wherein said drive shaft is carried by a drive shaft support means attached to the housing and said movable support shaft is slidably attached to a support shaft support means attached to the housing and is urged by the compression spring toward the self-centering support hub on the second end of the feed roller shaft.

4. A sheet feeding device as in claim 3, wherein said drive shaft has a first end and a second end, wherein a drive coupler is attached to the first end of said drive shaft, and said second end of said drive shaft is connected to said clutch means that provides an intermittent drive force to the drive shaft, said drive coupler being axially engagable with said self-centering coupling gear, and said clutch means comprises an electronically actuatable clutch.

5. A sheet feeding device as in claim 2, wherein said feed roller shaft has a longitudinal axis, and said feed module is mounted to the housing so as to pivot about said longitudinal axis to accommodate variation in the height of the stack, wherein the outermost sheet is the topmost sheet.

6. A sheet feeding device as in claim 2, wherein said separation means comprises an internally braked separation roller mounted on a pivot shaft, detachably mounted on a support means which is pivotally attached to the housing and is biased toward the feed means by a spring means.

7. A sheet feeding device as in claim 2, wherein the at least one urging roller and the at least one feed roller are decoupled from the infeed shaft and the feed roller shaft by the first one way bearing and the second one way bearing, so that a downstream series of transport rollers carried by the sheet transport means can rotate at a faster rate than the rotation rate of the at least one feed roller and the at least one urging roller without causing excessive tension on a fed sheet, wherein the at lesat one feed roller and the at least one urging roller rotate freely about the infeed shaft and the feed roller shaft toward the sheet transport means.

8. A sheet feeding device for separating an outermost sheet from a stack comprising:

a feed means for feeding an outermost sheet, said feed means being positionable in frictional contact with said stack to advance said outermost sheet toward a sheet transport means;

a separation means positioned adjacent to the feed means to prevent double feeding of sheets along a sheet path between said feed means and said separation means, wherein a nip is defined between the feed, means and the separation means, said separation means including an internally braked separation roller;

a clutch means in operable association with said feed means for transmitting an intermittent drive force to said feed means; and a retraction means for retracting the separation means away from the sheet path to permit a manual feeding of sheets to said sheet path, said retraction means being coupled to the separation means.

9. A sheet feeding device as in claim 8, wherein said internally braked separation roller is mounted on a support means via a pivot shaft, wherein said support means comprises a yoke defining a pair of slots therein and the pivot shaft is removably received by said pair of slots, and wherein the retraction means comprises an actuator means for causing the yoke to pivot about a yoke pivot axis in a direction away from the feed means.

10. A sheet feeding device for separating an outermost sheet from a stack comprising:

a stack support means for supporting said stack positioned in a first portion of a housing;

a feed module detachably and pivotally mounted to a second portion of said housing for positioning in contact with said stack, said feed module comprising:

an urging means for urging an outermost sheet from said stack, said urging means being mounted on said feed module using an infeed shaft, and a feed means for feeding the outermost sheet received from said urging means, said feed means being mounted on said feed module using a feed roller shaft;

a separation means for preventing double feeding of sheets said separation means being detachably mounted to the first portion of the housing by a support means, said separation means being positioned adjacent to the feed means and defining a nip between the separation means and the feed means;

a drive means for driving the feed module, said drive means being mounted in the second portion of the housing;

a clutch means connected to said drive means for transmitting an intermittent drive force from the drive means to said feed module; and a sheet transport means mounted to the housing for receiving said outermost sheet from the feed means;

wherein said sheet transport means comprises:

a series of transport rollers for receiving said outermost sheet from the feed means, said series of transport rollers being mounted on said second portion of said housing;

a series of idler rollers opposing said series of transport rollers and mounted on said first portion of said housing;

a trailing edge sensing means for detecting a trailing edge of the outermost sheet, wherein said trailing edge sensing means is positioned downstream of the nip, so that said clutch means is activated when said trailing edge of said outermost sheet is detected by said trailing edge sensing means; and a leading edge sensing means for detecting a leading edge of said outermost sheet, wherein said leading edge sensing means is positioned downstream of a first transport roller, so that said clutch means is deactivated when said leading edge of said outermost sheet is detected by said leading edge sensing means.

11. A sheet feeding device as in claim 10, wherein said second portion of said housing defines an indent for receiving the feed module adjacent to said stack support means.

12. A sheet feeding device as in claim 11, wherein said indent is flanked by portions of the housing defining a drive shaft support means and a support shaft support means.

13. A sheet feeding device as in claim 12, wherein said feed module comprises a feed module housing having an upper portion and a lower portion, wherein said feed module housing forms a first bearing between the upper portion and the lower portion and a second bearing between the upper portion and the lower portion.

14. A sheet feeding device as in claim 13, wherein said urging means comprises at least one urging roller being positioned on an urging roller hub having a first one way bearing positioned therein, and wherein the outermost sheet is a topmost sheet.

15. A sheet feeding device as in claim 14, wherein said at least one urging roller is mounted on an infeed shaft having a first end, a second end, and an infeed gear positioned near the first end of the infeed shaft; wherein said second end is disposed in said first bearing formed by the feed module housing, and said first end of the infeed shaft is disposed in said second bearing formed by the feed module housing.

16. A sheet feeding device as in claim 15, wherein said feed means comprises at least one feed roller being positioned on a feed roller hub having a second one way bearing positioned therein, said feed roller hub being positioned on the feed roller shaft.

17. A sheet feeding device as in claim 16, wherein said feed roller shaft has a first end and a second end, wherein said first end of the feed roller shaft is attached to a self-centering coupling gear that is in operable association with a drive shaft, and said second end of said feed roller shaft has a self-centering support hub mounted thereon, said self-centering support hub being received by a movable support shaft having a compression spring mounted thereon, wherein said drive shaft is rotatably carried by said drive shaft support means and said movable support shaft is slidably carried by said support shaft support means and is urged by the compression spring toward the self centering support hub on the second end of said feed roller shaft.

18. A sheet feeding device as in claim 17, wherein said drive shaft has a first end and a second end, wherein a drive coupler is attached to the first end of said drive shaft, and said second end is connected to said clutch means that provides an intermittent drive force to the drive shaft, said drive coupler being axially engagable with said self-centering coupling gear, and said clutch means comprises an electronically actuatable clutch.

19. A sheet feeding device as in claim 18 further comprising an idler gear for transferring the drive from the coupling gear to the infeed gear, said idler gear being positioned between and in operable association with the infeed gear and the self centering coupling gear.

20. A sheet feeding device as in claim 18, wherein said feed roller shaft has a longitudinal axis, and said feed module is pivotally attached to the second portion of the housing by the feed roller shaft to accommodate variation in the height of the stack.

21. A sheet feeding device as in claim 18, wherein said at least one urging roller is decoupled from the at least one feed roller by the second one way bearing so that when the electronically actuatable clutch is inactive, the at least one urging roller is not driven by movement of the feed roller.

22. A sheet feeding device as in claim 17, wherein the at least one urging roller and the at least one feed roller are decoupled from the infeed shaft and the feed roller shaft by the first one way bearing and the second one way bearing, so that the series of transport rollers can rotate at a faster rate than the rotation rate of the at least one feed roller and the at least one urging roller without causing excess tension on a fed sheet, wherein the at least one feed roller and at least one urging roller rotate freely about the infeed shaft and the feed roller shaft in the direction of the sheet transport means.

23. A sheet feeding device as in claim 10, wherein said separation means comprises an internally braked separation roller mounted on a pivot shaft, detachably mounted on a support means, said support means being pivotally attached to the first portion of the housing and being biased toward the feed means by a spring means.

24. A sheet feeding device for separating an outermost sheet from a stack comprising:

a stack support means disposed in a first portion of a housing;

a feed module detachably mounted to a second portion of said housing so as to be positionable in contact with said stack; said feed module comprising:

an urging means for urging an outermost sheet from said stack, said urging means being mounted in said feed module by an infeed shaft; and a feed means for feeding the outermost sheet received from said urging means, said feeding means being mounted in said feed module by a feed roller shaft;

a separation means for preventing a double feeding of sheets, said separation means being detachably mounted to said first portion of said housing by a support means, said separation means being positionable adjacent to the feed module so as to define a nip between the feed module and the separation means;

a sheet transport means mounted to the housing for receiving said outermost sheet from the feed module;

a drive means mounted to the second portion of the housing for driving the sheet transport means and the feed module;

a clutch means connected to said drive means for transmitting an intermittent drive force from the drive means to said feed module; and a retraction means for retracting the separation means away from the feed module to permit a manual feeding of sheets to the sheet transport means, said retraction means being coupled to the separation means, wherein said separation means comprises an internally braked separation roller.

25. A sheet feeding device as in claim 24, wherein the second portion of the housing comprises a panel means defining an opening therein, said panel means further defining a door, wherein said separation means is positioned within the opening so that when the door is in a closed position, the separation means is partially covered by the door.

26. A sheet feeding device as in claim 24, wherein said internally braked separation roller is mounted on a pivot shaft which is connected to the housing by a support means, wherein said support means comprises a yoke pivotally mounted to said first portion of said housing, said yoke defining a pair of slots therein, wherein the pivot shaft is removably received by each of said pair of slots, and wherein the retraction means comprises an actuator means for causing the yoke to pivot about a yoke pivot axis in a direction away from the feed module.

27. A sheet feeding device as in claim 26, wherein the first portion of the housing disengages from and pivots away from the second portion of the housing to expose the separation means and the sheet transport means.

28. A sheet feeding device as in claim 24, wherein the internally braked separation roller further comprises a core overlaid with a soft compliant material that is coated with a material having a Shore/durometer of less than 35.

29. A sheet feeding device as in claim 24, wherein said sheet transport means comprises:

a frame mounted to the second portion of the housing, a series of transport rollers mounted in the frame for receiving said outermost sheet from the feed means;

a trailing edge sensing means for detecting a trailing edge of the outermost sheet, wherein said trailing edge sensing means is positioned downstream of the nip, so that said clutch means is activated when said trailing edge of said outermost sheet is detected by said trailing edge sensing means; and a leading edge sensing means for detecting a leading edge of said outermost sheet, wherein said leading edge sensing means is positioned downstream of a first transport roller, so that said clutch means is deactivated when said leading edge of said outermost sheet is detected by said leading edge sensing means.

30. In a method for feeding an outermost sheet from a stack through a sheet feeding device, said method comprising placing a stack on a sheet feeding device;

urging said outermost sheet on top of the stack forward using a feed module which is removably mounted on a housing of said sheet feeding device;

separating said outermost sheet from the stack using a separation means;

transporting said outermost sheet through a sheet transport means; and controlling the feed module using an electronically actuatable clutch driven by a drive means.

31. A method as in claim 30 further comprising the steps of:

activating the electronically actuatable clutch;

sensing a leading edge of said outermost sheet in the sheet transport means;

deactivating the electronically actuatable clutch;

sensing a trailing edge of said outermost sheet in the sheet transport means; and activating the electronically actuatable clutch.

32. A method as in claim 30, further comprising the steps of:

retracting the separation means away from the feed module, and manually feeding another sheet to the sheet transport means.

33. A sheet feeding device for separating an outermost sheet from a stack comprising:

a feed means for feeding an outermost sheet, said feed means being positionable in frictional contact with said stack to advance said outermost sheet toward a sheet transport means;

a separation means positioned adjacent to the feed means to prevent double feeding of sheets along a sheet path between said feed means and said separation means, wherein a nip is defined between the feed means and the separation means, said separation means including an internally braked separation roller which is detachably mounted on a support means which is attached to a housing; and a clutch means in operable association with said feed means for transmitting an intermittent drive force to said feed means.

*34. A sheet feeding device for separating an outermost sheet from a stack, said sheet feeding device comprising:*

*a sheet transport means;*

*a feed means for feeding said outermost sheet from said stack positioned so as to frictionally contact the outermost sheet of said stack to advance said outermost sheet toward the sheet transport means;*

*a separation means positioned adjacent to said feed roller so as to define a nip between the separation means and the feed means and to prevent double feeding along a sheet path between said feed means and said separation means; and*

*an intermittent driver in operable association with said feed roller for transmitting an intermittent drive force to said feed means;*

*wherein said sheet transport means comprises:*

*a sensing means for sensing when a trailing edge of said outermost sheet is positioned downstream of the nip and activating said intermittent driver in response thereto, and for sensing when a leading edge of said outermost sheet is positioned downstream of a first transport roller of the sheet transport means and deactivating the intermittent driver response thereto;*

*said sheet feeding device further comprising a housing for mounting said feed means, said feed means comprising a feed module which is detachably mounted to said housing.*

*35. A sheet feeding device for separating an outermost sheet from a stack, said sheet feeding device comprising:*

*a sheet transport;*

*a feed roller for feeding said outermost sheet from said stack positioned so as to frictionally contact the outermost sheet of said stack to advance said outermost sheet toward the sheet transport;*

*a separation device positioned adjacent to said feed roller so as to define a nip between the separation device and the feed roller and to prevent double feeding along a sheet path between said feed roller and said separation device; and*

*an intermittent driver in operable association with said feed roller for transmitting an intermittent drive force to said feed roller;*

*wherein said sheet transport comprises:*

*a sensor for sensing when a trailing edge of said outermost sheet is positioned downstream of the nip and activating said intermittent driver in response thereto, and for sensing when a leading edge of said outermost sheet is positioned downstream of a first transport roller of the sheet transport and deactivating the intermittent driver response thereto;*

*said sheet feeding device further comprising a housing for mounting said feed roller, said feed roller comprising a feed module which is detachably mounted to said housing.*

*36. A sheet feeding device for separating an outermost sheet from a stack comprising:*

*a feed means for feeding an outermost sheet, said feed means being positionable in frictional contact with said stack to advance said outermost sheet toward a sheet transport means;*

*a separation means positioned adjacent to the feed means to prevent double feeding of sheets along a sheet path between said feed means and said separation means, wherein a nip is defined between the feed means and the separation means said separation means including an internally braked separation roller;*

*an intermittent driver in operable association with said feed means for transmitting an intermittent drive force to said feed means; and*

*a retraction means for retracting the separation means away from the sheet path to permit a manual feeding of sheets to said sheet path, said retraction means being coupled to the separation means.*

*37. A sheet feeding device for separating an outermost sheet from a stack comprising:*

*a feed module for feeding an outermost sheet, said feed module being positionable in frictional contact with said stack to advance said outermost sheet toward a sheet transport;*

*a separation device positioned adjacent to the feed module to prevent double feeding of sheets along a sheet path between said feed module and said separation device wherein a nip is defined between the feed module and the separation device, said separation device including an internally braked separation roller;*

*an intermittent driver in operable association with said feed module for transmitting an intermittent drive force to said feed module; and*

*a retraction means for retracting the separation device away from the sheet path to permit a manual feeding of sheets to said sheet path, said retraction means being coupled to the separation device.*

*38. A sheet feeding device for separating an outermost sheet from a stack comprising:*

*a stack support means for supporting said stack positioned in a housing;*

*a feed module detachably and pivotally mounted to said housing for positioning in contact with said stack, said feed module comprising:*

*an urging means for urging an outermost sheet from said stack, said urging means being mounted on said feed module using an infeed shaft, and*

*a feed means for feeding the outermost sheet received from said urging means, said feed means being mounted on said feed module using a feed roller shaft;*

*a separation means for preventing double feeding of sheets said separation means being detachably mounted to the housing by a support means, said separation means being positioned adjacent to the feed means and defining a nip between the separation means and the feed means;*

*a drive means for driving the feed module, said drive means being mounted in the housing;*

*an intermittent driver connected to said drive means for transmitting an intermittent drive force from the drive means to said feed module; and*

*a sheet transport means mounted to the housing for receiving said outermost sheet from the feed means;*

*wherein said sheet transport means comprises:*

*a series of transport rollers for receiving said outermost sheet from the feed means, said series of transport rollers being mounted on said housing;*

*a series of idler rollers opposing said series of transport rollers;*

*a sensing means for detecting a trailing edge of the outermost sheet, so that said intermittent driver is activated when said trailing edge of said outermost sheet is detected by said sensing means, and for detecting a leading edge of said outermost sheet, so that said intermittent driver is deactivated when said leading edge of said outermost sheet is detected by said sensing means.*

*39. A sheet feeding device for separating an outermost sheet from a stack comprising:*

*a stack support for supporting said stack positioned in a housing;*

*a feed module detachably and pivotally mounted to said housing for positioning in contact with said stack, said feed module comprising:*

*an urging roller for urging an outermost sheet from said stack, said urging roller being mounted on said feed module using an infeed shaft, and*

*a feed roller for feeding the outermost sheet received from said urging roller, said feed roller being mounted on said feed module using a feed roller shaft;*

*a separation device for preventing double feeding of sheets, said separation device being detachably mounted to the housing by a support, said separation device being positioned adjacent to the feed roller and defining a nip between the separation device and the feed roller;*

*a driver for driving the feed module, said driver being mounted in the housing wherein said driver transmits an intermittent drive force from the driver to said feed module; and*

*a sheet transport mounted to the housing for receiving said outermost sheet from the feed roller;*

*wherein said sheet transport comprises:*

*a series of transport rollers for receiving said outermost sheet from the feed roller, said series of transport rollers being mounted on said housing;*

*a series of idler rollers opposing said series of transport rollers;*

*a sensor for detecting a trailing edge of the outermost sheet, so that said intermittent driver is activated when said trailing edge of said outermost sheet is detected by said sensor, and for detecting a leading edge of said outermost sheet, so that said driver is deactivated when said leading edge of said outermost sheet is detected by said sensor.*

*40. A sheet feeding device for separating an outermost sheet from a stack comprising:*

*a stack support means disposed in a first portion of a housing;*

*a feed module detachably mounted to a second portion of said housing so as to be positionable in contact with said stack; said feed module comprising:*

*an urging means for urging an outermost sheet from said stack, said urging means for being mounted in said feed module by an infeed shaft; and*

*a feed means for feeding the outermost sheet received from said urging means, said feeding means being mounted in said feed module by a feed roller shaft;*

*a separation means for preventing a double feeding of sheets, said separation means being detachably mounted to said first portion of said housing by a support means, said separation means being positionable adjacent to the feed module so as to define a nip between the feed module and the separation means;*

*a sheet transport means mounted to the housing for receiving said outermost sheet from the feed module;*

*a drive mounted to the housing for driving the sheet transport means and the feed module for transmitting an intermittent drive force from the drive to said feed module; and*

*a retraction means for retracting the separation means away from the feed module to permit a manual feeding of sheets to the sheet transport means, said retraction means being coupled to the separation means,*

*wherein said separation means comprises an internally braked separation roller.*

*41. A sheet feeding device for separating an outermost sheet from a stack comprising:*

*a stack support disposed in a housing;*

*a feed module detachably mounted to said housing so as to be positionable in contact with said stack; said feed module comprising:*

*an urging roller for urging an outermost sheet from said stack, said urging roller being mounted in said feed module by an infeed shaft; and*

*a feed roller for feeding the outermost sheet received from said urging roller, said feeding roller being mounted in said feed module by a feed roller shaft;*

*a separator for preventing a double feeding of sheets, said separator being detachably mounted to said housing by a support, said separator being positionable adjacent to the feed module so as to define a nip between the feed module and the separator;*

*a sheet transport mounted to the housing for receiving said outermost sheet from the feed module;*

*a drive mounted to the second portion of the housing for driving the sheet transport and the feed module for transmitting an intermittent drive force from the drive to said feed module; and*

*a retraction device for retracting the separator away from the feed module to permit a manual feeding of sheets to the sheet transport, said retraction device being coupled to the separator,*

*wherein said separator comprises an internally braked separation roller.*

* * * * *